(12) United States Patent
Miyahara

(10) Patent No.: US 9,202,150 B2
(45) Date of Patent: Dec. 1, 2015

(54) PRINT CONTROL SYSTEM, PRINT CONTROL METHOD, AND COMPUTER PROGRAM PRODUCT

(71) Applicant: Seiji Miyahara, Tokyo (JP)

(72) Inventor: Seiji Miyahara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/249,297

(22) Filed: Apr. 9, 2014

(65) Prior Publication Data

US 2014/0307277 A1  Oct. 16, 2014

(30) Foreign Application Priority Data

Apr. 11, 2013  (JP) .................................. 2013-083155

(51) Int. Cl.
| | |
|---|---|
| *G06F 15/00* | (2006.01) |
| *G06K 1/00* | (2006.01) |
| *G06K 15/02* | (2006.01) |
| *H04N 1/00* | (2006.01) |
| *H04N 1/60* | (2006.01) |

(52) U.S. Cl.
CPC .......... *G06K 15/1878* (2013.01); *G06K 15/026* (2013.01); *H04N 1/00233* (2013.01); *H04N 1/00244* (2013.01); *H04N 1/603* (2013.01)

(58) Field of Classification Search
None
See application file for complete search history.

(56) References Cited

U.S. PATENT DOCUMENTS

| | | | | |
|---|---|---|---|---|
| 7,542,167 | B2 * | 6/2009 | Ito et al. .......................... | 358/1.9 |
| 2004/0105581 | A1 * | 6/2004 | Sawada .......................... | 382/162 |
| 2007/0236759 | A1 * | 10/2007 | Ohga ............................. | 358/518 |
| 2010/0085586 | A1 * | 4/2010 | Tin ................................. | 358/1.9 |
| 2011/0304863 | A1 * | 12/2011 | Shibuya ......................... | 358/1.9 |

FOREIGN PATENT DOCUMENTS

JP   2002-252785   9/2002

* cited by examiner

*Primary Examiner* — Vincent Rudolph
*Assistant Examiner* — Michael Burleson
(74) *Attorney, Agent, or Firm* — Duft Bornsen & Fettig LLP

(57) ABSTRACT

A print control system includes: a color reference generation unit that generates color reference information defining a color reference for reproducing a color characteristic of a first output device by a second output device designated as a print destination using a first output profile representing a color reproduction characteristic of the first output device serving as a reference of color matching; a first color conversion unit that applies color conversion to image data designated as a print target using the color reference information and a second output profile representing a color reproduction characteristic of the second output device; and a transmission unit that transmits the converted image data to the second output device and requests printing.

9 Claims, 10 Drawing Sheets

FIG.3
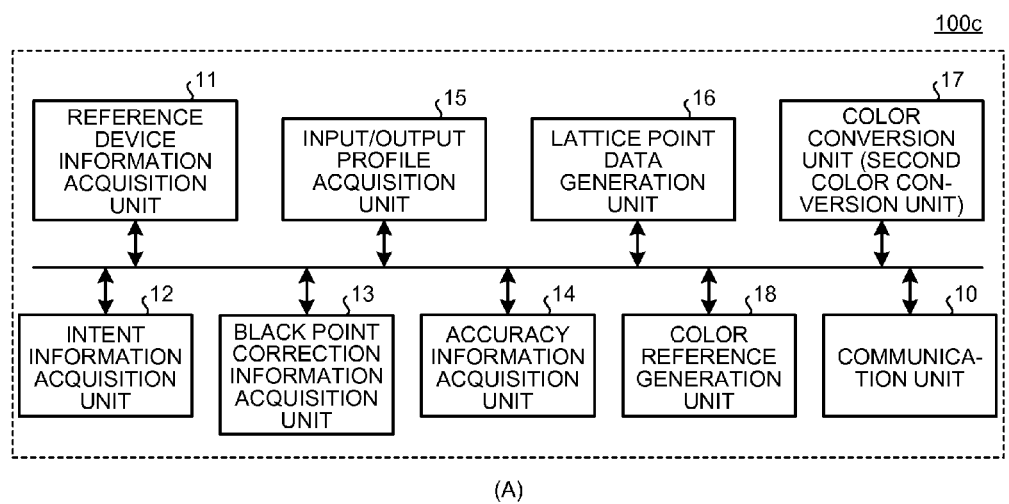
(A)
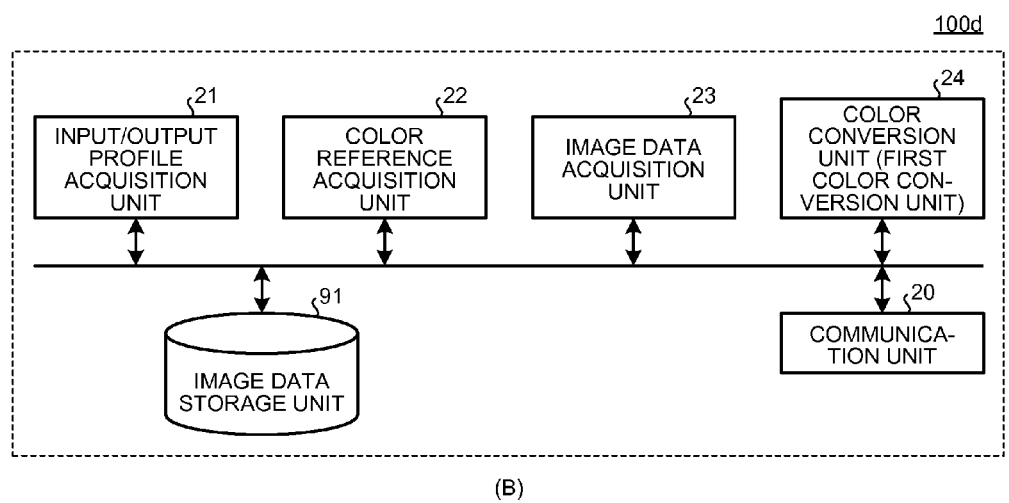
(B)

| Lab_L=33 | Lab_a=33 | Lab_b=33 | CMYK_C | CMYK_M | CMYK_Y | CMYK_K |
|---|---|---|---|---|---|---|
| 0 | -128 | -128 | 85.882 | 14.118 | 14.118 | 14.118 |
| 0 | -128 | -120.031 | 85.882 | 14.118 | 15.294 | 14.118 |
| 0 | -128 | -112.063 | 85.882 | 14.118 | 17.647 | 14.118 |
| 0 | -128 | -104.094 | 85.882 | 14.51 | 19.608 | 14.118 |
| 0 | -128 | -96.125 | 85.882 | 14.51 | 22.353 | 14.118 |
| 0 | -128 | -88.156 | 85.882 | 14.51 | 25.882 | 14.118 |
| 0 | -128 | -80.188 | 85.882 | 14.51 | 29.804 | 14.118 |
| 0 | -128 | -72.219 | 85.882 | 14.51 | 33.725 | 14.118 |
| 0 | -128 | -64.25 | 85.882 | 14.118 | 38.824 | 14.118 |
| 0 | -128 | -56.281 | 85.882 | 14.118 | 45.098 | 14.118 |
| 0 | -128 | -48.313 | 85.882 | 14.51 | 51.373 | 14.118 |
| 0 | -128 | -40.344 | 85.882 | 14.51 | 58.039 | 14.118 |
| … | … | … | … | … | … | … |

| CMYK_C=17 | CMYK_M=17 | CMYK_Y=17 | CMYK_K=17 | Lab_L | Lab_a | Lab_b |
|---|---|---|---|---|---|---|
| 0 | 0 | 0 | 0 | 100 | 0 | 0 |
| 0 | 0 | 0 | 6.25 | 94.902 | 0 | 0 |
| 0 | 0 | 0 | 12.5 | 89.804 | 0 | 0 |
| 0 | 0 | 0 | 18.75 | 84.706 | 0 | 0 |
| 0 | 0 | 0 | 25 | 79.608 | 0 | -1 |
| 0 | 0 | 0 | 31.25 | 74.51 | 0 | -1 |
| 0 | 0 | 0 | 37.5 | 69.412 | 0 | -1 |
| 0 | 0 | 0 | 43.75 | 64.314 | 0 | -1 |
| 0 | 0 | 0 | 50 | 59.216 | 0 | -1 |
| 0 | 0 | 0 | 56.25 | 54.118 | 0 | 0 |
| 0 | 0 | 0 | 62.5 | 49.02 | 0 | 0 |
| 0 | 0 | 0 | 68.75 | 44.314 | 0 | 0 |
| 0 | 0 | 0 | 75 | 39.216 | 0 | 0 |
| 0 | 0 | 0 | 81.25 | 34.118 | 1 | 1 |
| 0 | 0 | 0 | 87.5 | 28.627 | 1 | 2 |
| ... | ... | ... | ... | ... | ... | ... |

FIG.10

| BEGIN_LUT CLUT 3 3 | | | | | D3 |
|---|---|---|---|---|---|
| RGB_R=32 | RGB_G=32 | RGB_B=32 | Lab_L | Lab_a | Lab_b |
| 0 | 0 | 0 | 0.348 | -127.113 | -127.113 |
| 0 | 0 | 3.226 | 0.784 | -127.086 | -120.802 |
| 0 | 0 | 6.452 | 1.009 | -127.004 | -116.016 |
| 0 | 0 | 9.677 | 1.184 | -126.829 | -111.393 |
| 0 | 0 | 12.903 | 1.407 | -126.568 | -106.109 |
| 0 | 0 | 16.129 | 1.688 | -126.257 | -100.105 |
| 0 | 0 | 19.355 | 2.02 | -125.911 | -93.626 |
| 0 | 0 | 22.581 | 2.397 | -125.521 | -86.856 |
| ... | ... | ... | ... | ... | ... |

PRINT CONTROL SYSTEM, PRINT CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2013-083155 filed in Japan on Apr. 11, 2013.

BACKGROUND OF THE INVENTION

1. Field of the Invention

The present invention relates to a print control system, a print control method, and a computer program product.

2. Description of the Related Art

A CMYK color space mainly used by a multifunction peripheral (MFP) or a printer that prints image data is a color space (a device-dependent color space) depending on an output device (an output device that performs printing). Accordingly, printed colors are different depending on the output device even if the same CMYK data (image data in the CMYK color space) is printed. To match intended colors among a plurality of output devices, known is a color management technology via a device-independent color space. Examples thereof include a color management system (CMS) using an International Color Consortium (ICC) profile. Image data (hereinafter, referred to as "general-purpose RGB data") in a general RGB color space (hereinafter, referred to as a general-purpose RGB color space) such as an sRGB or the Adobe (registered trademark) RGB has a very large color gamut (range of color reproduction; Gamut) as compared to the color space of the output device. To print the general-purpose RGB data by the output device, known is a color conversion (color compression) technology from a wide color gamut to a narrow color gamut, which is called gamut mapping.

However, in the related art, there may be a case in which the intended colors do not match among the output devices.

For example, Japanese Patent No. 3980343 discloses a technology for converting input image data to data that can be reproduced by an output device as follows. In the technology of Japanese Patent No. 3980343, input color data is converted to color data that can be reproduced by the output device referring to representative color data after color compression and the color gamut of the device that are stored in advance with respect to a color system of the input color data and a virtual color gamut for each output method.

As described above, to print the input image data by the output devices of which color spaces are different from each other, it is necessary to hold gamut information (definition information of the color gamut) that defines a mapping rule (alternative color) for each output device because shapes of the color gamut are different for each output device. In addition, in the related art, mapping is performed depending on the shape of the color gamut, so that mapped colors are different for each output device. Accordingly, in the related art, intended colors do not match among the output devices. That is, in the related art, reproduced colors for each output device do not match in compatible printing.

In view of such a situation, there is a need to provide a print control system, a print control method, and a computer program product that can match the reproduced colors for each output device.

SUMMARY OF THE INVENTION

It is an object of the present invention to at least partially solve the problems in the conventional technology.

According to the present invention, there is provided a print control system comprising: a color reference generation unit configured to generate color reference information defining a color reference for reproducing a color characteristic of a first output device by a second output device designated as a print destination using a first output profile representing a color reproduction characteristic of the first output device serving as a reference of color matching; a first color conversion unit configured to apply color conversion to image data designated as a print target using the color reference information and a second output profile representing a color reproduction characteristic of the second output device; and a transmission unit configured to transmit the converted image data to the second output device and requests printing.

The present invention also provides a print control method comprising: generating color reference information defining a color reference for reproducing a color characteristic of a first output device by a second output device designated as a print destination using a first output profile representing a color reproduction characteristic of the first output device serving as a reference of color matching; applying color conversion to image data designated as a print target using the color reference information and a second output profile representing a color reproduction characteristic of the second output device; and transmitting the converted image data to the second output device and requesting printing.

The present invention also provides a computer program product comprising a non-transitory computer-readable recording medium having a print control program that causes a computer to execute: generating color reference information defining a color reference for reproducing a color characteristic of a first output device by a second output device designated as a print destination using a first output profile representing a color reproduction characteristic of the first output device serving as a reference of color matching; applying color conversion to image data designated as a print target using the color reference information and a second output profile representing a color reproduction characteristic of the second output device; and transmitting the converted image data to the second output device and requesting printing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3(A) and 3(B) are diagrams illustrating a configuration example of a print control function according to the first embodiment;

FIG. 5 is a diagram illustrating an example of a setting screen for setting a print condition according to the first embodiment;

FIG. 8 is a diagram illustrating an example of data of color conversion information (Part 1) according to the first embodiment;

FIG. 9 is a diagram illustrating an example of data of the color conversion information (Part 2) according to the first embodiment; and FIG. 10 is a diagram illustrating an example of data of color reference information according to the first embodiment.

DETAILED DESCRIPTION OF THE PREFERRED EMBODIMENTS

The following describes an embodiment of a print control system, a print control method, and a computer program product in detail with reference to accompanying drawings.

First Embodiment

System Configuration

Figure 1:
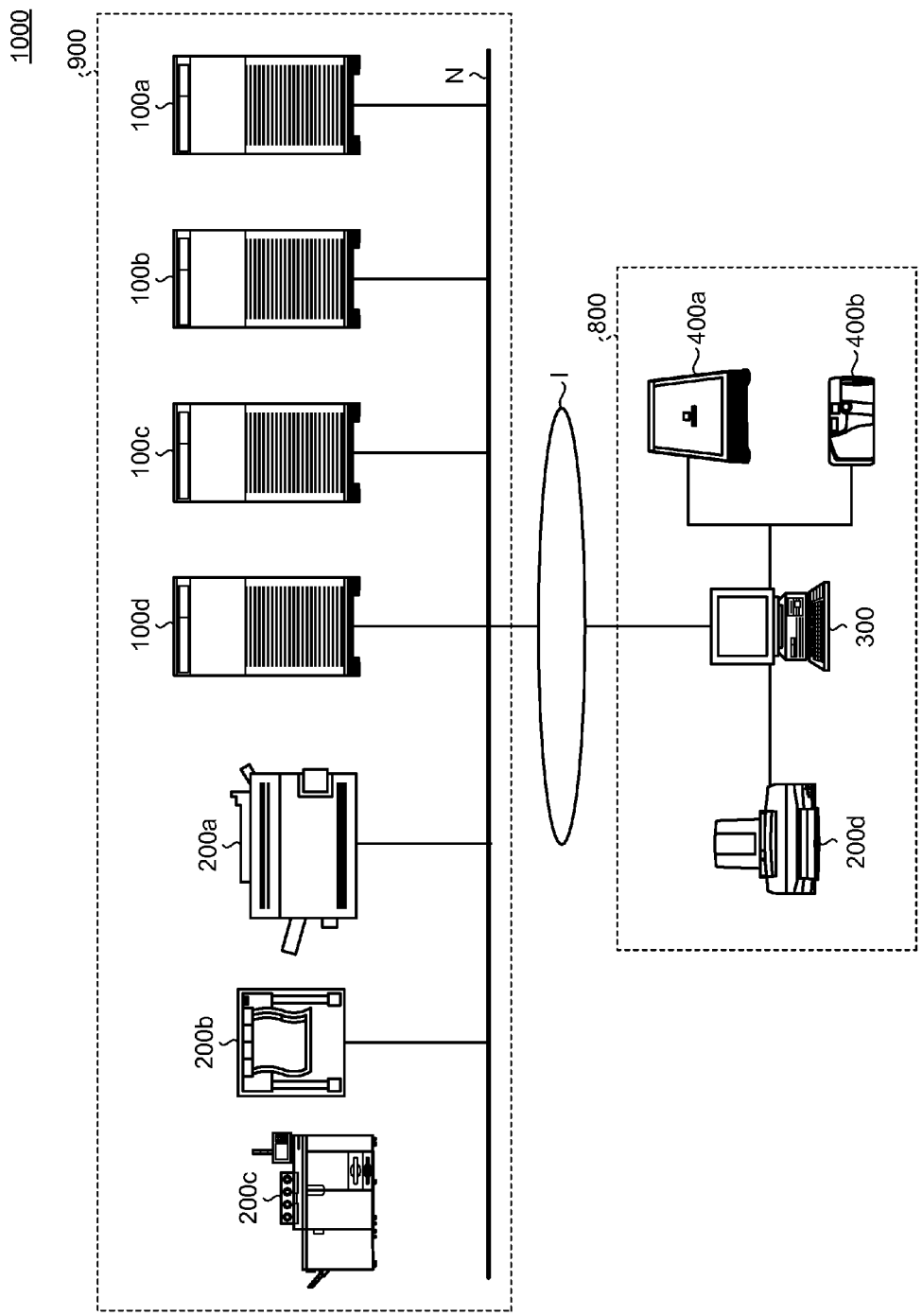
FIG. 1 is a diagram illustrating a configuration example of a print control system according to a first embodiment.

FIG. 1 is a diagram illustrating a configuration example of a print control system 1000 according to a first embodiment. FIG. 1 illustrates an example of a system configuration that provides print service via a network.

The print control system 1000 illustrated in FIG. 1 generally includes two systems. Specifically, it includes a system 900 used for providing the print service called a print service provider (PSP) (hereinafter, referred to as a "system on the PSP side 900") and a system 800 used for utilizing the print service (hereinafter, referred to as a "system on the user side 800"). The system on the PSP side 900 and the system on the user side 800 are connected to each other via an external network I such as the Internet, for example.

The system on the PSP side 900 according to the present embodiment includes one or a plurality of servers (information processing devices) 100*a* to 100*d* (hereinafter, collectively referred to as a "server 100" in some cases). The system on the PSP side 900 also includes one or a plurality of output devices 200*a* to 200*c* (hereinafter, collectively referred to as an "output device 200" in some cases).

The server 100 according to the present embodiment includes a Web server 100*a*, a profile management server 100*b*, a color reference generation server 100*c*, and an image processing server 100*d*. The server 100 corresponds to an information processing device in which various pieces of information processing are performed for implementing a print control function.

The Web server 100*a* provides a user interface (UI) function of the print service to a user (an orderer of a printed matter). The Web server 100*a* also mediates exchange of data between the system on the PSP side 900 and the system on the user side 800.

The profile management server 100*b* holds and manages, in a predetermined storage region, an output profile representing a color reproduction characteristic of the output device 200, color reference information serving as a reference for color matching, an input profile representing an input color conversion characteristic of the general-purpose RGB color space, and the like. The output profile corresponds to a profile representing the color reproduction characteristic of the output device 200 included in the system on the PSP side 900. The color reference information corresponds to information representing a correspondence relation between a value of the general-purpose RGB color space and a value of a uniform color space independent of the output device generated by the color reference generation server 100*c*. The input profile corresponds to a profile representing the input color conversion characteristic of the general-purpose RGB color space.

The color reference generation server 100*c* generates the color reference information based on the various profiles and a set value designated by the user (setting of the color reference generation condition). A format of the generated color reference information is the same as that of the profile.

According to a print request from the user, the image processing server 100*d* performs color conversion of image data to be printed (input image data) using the color reference information and various profiles, and transmits the converted image data to the designated output device 200 (print destination). Accordingly, the image processing server 100*d* requests the output device 200 for printing.

Examples of the output device 200 according to the present embodiment include a printing machine, an ink-jet printer, and an electrophotographic printer. The output device 200 corresponds to an image forming apparatus that prints an image using various output methods (image forming methods). Generally, an image processing device (not illustrated) called a digital front end (DFE) that performs rendering of the image data is connected to each output device 200.

The server 100 and the output device 200 are, for example, connected to an internal network N (hereinafter, referred to as a "network N" for convenience) such as a local area network (LAN), and connected to the external network I via the network N.

In the example of FIG. 1, the server 100 and the output device 200 included in the system on the PSP side 900 are connected to the same network N (in the same segment). However, the embodiment is not limited thereto. The server 100 and the output device 200 are not necessarily connected to the same network. Alternatively, each of them may be arranged on the network N in a different segment. In the example of FIG. 1, the independent server 100 is provided for each function provided by executing each piece of information processing. However, the embodiment is not limited thereto. Each function does not require the server 100 individually. Functions may be implemented by one server 100 (a single body) (respective pieces of information processing may be executed in a common environment). Each function may be implemented by cloud computing using a virtual appliance technology.

The system on the user side 800 according to the present embodiment includes a terminal 300, an output device 200*d*, one or a plurality of input devices 400*a* and 400*b* (hereinafter, collectively referred to as an "input device 400" in some cases), and the like.

The terminal 300 according to the present embodiment, for example, corresponds to a personal computer (PC), a tablet, a smart phone, and the like. The terminal 300 creates the image data to be printed, receives a designation of the image data to be printed, orders a printed matter (print request), and receives various print settings including the print condition. The terminal 300 is connected to the system on the PSP side 900 via the external network I. Accordingly, the image data to be printed, the print request, the print setting, and the like are transmitted to the server 100 included in the system on the PSP side 900 via the external network I.

The input device 400 according to the present embodiment, for example, corresponds to a scanner and a digital camera. The input device 400 reads the image and captures the image data. The input device 400 is connected to the terminal 300 via a predetermined data transmission path. Accordingly, the captured image data is input to the terminal 300 via the predetermined data transmission path. The communication in the predetermined data transmission path may be performed wirelessly or in a wired manner.

The output device 200 included in the system on the user side 800 corresponds to an image forming apparatus for printing a small amount of image data on the user side (for example, an "ink-jet printer for home use or a graphic arts" and a "low-speed and low-cost laser printer").

With the configuration as described above, the print control system 1000 according to the present embodiment provides the print service as follows. The user creates or designates the image data to be printed using the terminal 300 via the UI function provided by the Web server 100a, performs print setting, and requests printing. The terminal 300 then transmits the image data to be printed and the print setting to the Web server 100a. Thereafter, the Web server 100a requests the color reference generation server 100c to perform generation processing on the color reference information. The color reference generation server 100c generates the color reference information based on the setting of the color reference generation condition included in the print setting and the various profiles managed by the profile management server 100b, and requests the image processing server 100d to perform color conversion processing. The image processing server 100d applies color conversion to the image data to be printed using the color reference information generated by the color reference generation server 100c and the various profiles managed by the profile management server 100b. The image processing server 100d transmits the converted image data and the print setting to the output device 200 and requests printing. As a result, the converted image data is printed by the output device 200 according to an operation condition designated in the print setting. Accordingly, the printed matter desired by the user is generated.

Device Configuration

Figure 2:
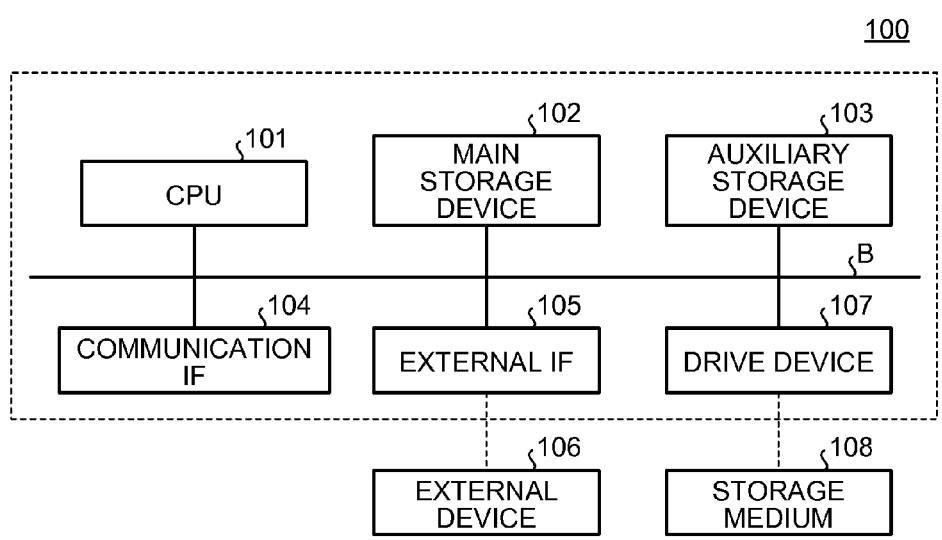
FIG. 2 is a diagram illustrating a configuration example of a server according to the first embodiment.

FIG. 2 is a diagram illustrating a configuration example of the server 100 according to the present embodiment. FIG. 2 illustrates a configuration example of a typical information processing device.

As illustrated in FIG. 2, the server 100 according to the present embodiment includes a central processing unit (CPU) 101, a main storage device 102, and the like. The server 100 also includes an auxiliary storage device 103, a communication interface (IF) 104, an external IF 105, a drive device 107, and the like. In the server 100, the devices are connected to each other via a bus B.

The CPU 101 is an arithmetic unit for implementing built-in functions and control of the entire device. The main storage device 102 is a storage device (memory) that holds a computer program or data in a predetermined storage region. Examples of the main storage device 102 include a read only memory (ROM) and a random access memory (RAM). The auxiliary storage device 103 is a storage device including a storage region of which capacity is larger than that of the main storage device 102. Examples of the auxiliary storage device 103 include a non-volatile storage device such as a hard disk drive (HDD) and a memory card. Accordingly, for example, the CPU 101 reads the program or data from the auxiliary storage device 103 to the main storage device 102 and performs processing to implement the built-in functions and the control of the entire device.

For example, the communication IF 104 corresponds to a network interface card (NIC), and is an interface that connects the device to the network N. Accordingly, the server 100 can perform data communication with the other server 100 or the output device 200. The external IF 105 is an interface for exchanging data between the device and the external device 106. Examples of the external device 106 include a display device that displays various pieces of information such as a processing result (for example, a "liquid crystal display"), and an input device that receives an operation input (for example, a "numeric keypad", a "keyboard", or a "touch panel"). The drive device 107 is a control device that writes or reads to/from the storage medium 108. Examples of the storage medium 108 include a flexible disk (FD), a compact disc (CD), and a digital versatile disc (DVD).

With the configuration described above, the print control system 1000 according to the present embodiment can provide the print control function for generating the printed matter desired by the user.

Print Control Function

The following describes the print control function according to the present embodiment. The print control system 1000 according to the present embodiment determines device-independent profile connection space (PCS) data (data of a profile connection space) in a case where the general-purpose RGB data is printed by a first output device using the various profiles. In this case, the print control system 1000 uses an input profile that represents a color reproduction characteristic of the general-purpose RGB data independent of the output device 200, and an output profile that represents a color reproduction characteristic of the first output device serving as a reference of color matching. Next, the print control system 1000 according to the present embodiment generates color reference information (information that defines a color reference for reproducing a color characteristic of the first output device by a second output device) based on the determined PCS data. In this case, the print control system 1000 generates a correspondence relation (conversion rule) between general-purpose RGB values and the determined PCS values as color reference information of the RGB color space (a color reference on the input side). Next, the print control system 1000 according to the present embodiment converts a color space on the input side to a color space on the output side (print destination) regarding the image data to be printed, using the generated color reference information and the various profiles. In this case, the print control system 1000 uses the generated color reference information and an output profile representing a color reproduction characteristic of the second output device of which reproduced color (print color) should be matched with that of the first output device. The print control system 1000 according to the present embodiment then transmits the converted image data, and printing is performed by the second output device. The print control system 1000 according to the present embodiment has the function as described above.

In the related art, regarding a color system of input color data or a virtual color gamut for each image forming method, for example, the input color data is converted to color data that can be reproduced by the output device 200 with reference to the representative color data after color compression and the color gamut of the output device 200 that are stored in advance.

In this way, when the input image data is printed by the output device 200 having a different color space, the shape of the color gamut is different for each output device 200. Accordingly, it is necessary to hold gamut information that defines a mapping rule for each output device 200. In the related art, mapping is performed depending on the shape of the color gamut, so that mapped colors are different for each output device 200. Accordingly, in the related art, the intended colors do not match among the output devices 200. That is, in the related art, the reproduced colors for each output device 200 do not match in compatible printing.

In the print control function according to the present embodiment, a mechanism is as follows when the general-purpose RGB data is printed by the first output device serving as a reference of color matching and the second output device different from the first output device. The print control function according to the present embodiment determines an RGB color reference corresponding to a color conversion characteristic in a case where the general-purpose RGB data is printed by the first output device, using the profile of the first output device. The print control function according to the present embodiment applies color conversion to the image data to be printed using the determined RGB color reference and the output profile of the second output device, to print the data by the second output device.

Accordingly, the print control function according to the present embodiment provides an environment that applies color conversion to the image data to be printed, based on the color reference obtained from the color reproduction characteristic of the first output device serving as a compatible destination and the color reproduction characteristic of the second output device serving as a print destination. As a result, in the print control system 1000 according to the present embodiment, gamut mapping depending on the output device 200 is not performed, but compatible printing may be performed that can reproduce the color characteristic of the first output device by the second output device. Accordingly, in the print control system 1000 according to the present embodiment, the reproduced colors for each output device 200 can be matched and high-quality print service can be provided.

The following describes a configuration and an operation of the print control function according to the present embodiment. FIGS. 3(A) and 3(B) are diagrams illustrating a configuration example of the print control function according to the present embodiment. As illustrated in FIGS. 3(A) and 3(B), the print control function according to the present embodiment can be divided into a function that generates the color reference information (hereinafter, referred to as a "color reference generation function") and a function that performs image processing such as color conversion based on the generated color reference information (hereinafter, referred to as an "image processing function"). The color reference generation function is included in the color reference generation server 100c, and the image processing function is included in the image processing server 100d.

Color Reference Generation Function

As illustrated in FIG. 3(A), the color reference generation server 100c includes a communication unit 10, a reference device information acquisition unit 11, an intent information acquisition unit 12, a black point correction information acquisition unit 13, and the like. The color reference generation server 100c also includes an accuracy information acquisition unit 14, an input/output profile acquisition unit 15, a lattice point data generation unit 16, a color conversion unit (second color conversion unit) 17, a color reference generation unit 18, and the like.

The communication unit 10 includes a data receiving unit and a data transmission unit, and performs data communication (transmission and reception of various pieces of information) between the color reference generation server 100c and the other server 100 as well as the output device 200. In this case, the other server 100 and the output device 200 includes the Web server 100a, the profile management server 100b, the image processing server 100d, various output devices 200, and the like. The communication unit 10 performs data communication by controlling the communication IF 104 included in the color reference generation server 100c.

The reference device information acquisition unit 11 acquires reference device information of a reference device. The reference device corresponds to the first output device designated as a reference of the intended color among the output devices 200 (a reference of color matching). That is, the reference device information acquisition unit 11 acquires device information of the output device 200 (device information of the first output device) designated as a reference between the output devices 200 (between the first output device and the second output device) of which reproduced colors should be close to each other in printing. The reference device is designated by the user.

The intent information acquisition unit 12 acquires intent information of the reference device. An ICC profile (a file that defines a color space characteristic of an input/output device) defines four rendering intents (color conversion system) as follows. For example, the rendering intents include "Perceptual", "Saturation", "Absolute Colorimetric", and "Relative Colorimetric". Accordingly, the intent information acquisition unit 12 acquires, as the intent information, a definition of the system of color conversion performed by the first output device designated as the reference device.

The black point correction information acquisition unit 13 acquires black point correction information representing whether or not black point correction is performed in color conversion. Generally, printed black is not darker than displayed black. Accordingly, when color on a screen is reproduced as it is on the printed matter, color of low brightness is blurred in black. The black point correction is correction processing for preventing this. The black point correction information acquisition unit 13 acquires, as the black point correction information, a set value representing whether or not such correction processing is performed in color conversion. Whether or not to perform black point correction is designated (set) by the user.

The accuracy information acquisition unit 14 acquires accuracy information representing accuracy of the color reference. For example, the accuracy of the color reference corresponds to a size (extent) of the interval width between lattice points in the color space on the input side of the color reference, and the interval width between the lattice points can be designated in a stepwise manner. Accordingly, the accuracy information acquisition unit 14 acquires, as the accuracy information, a set value representing the accuracy of the color reference in a stepwise manner (a set value of the interval width between the lattice points). The accuracy of the color reference is designated (set) by the user.

The input/output profile acquisition unit 15 acquires an input/output profile from the profile management server 100b. The input/output profile acquisition unit 15 acquires, from the profile management server 100b, an input profile of the general-purpose RGB color space used in generating the color reference and an output profile (first output profile) of the reference device. The input/output profile acquisition unit 15 may acquire an embedded input profile from the image data to be printed, for example.

The lattice point data generation unit 16 generates lattice point data in the color space on the input side of the color reference. The lattice point data generation unit 16 determines the interval width between the lattice points to generate the lattice point data based on the accuracy information acquired by the accuracy information acquisition unit 14. In the present embodiment, the color space on the input side of the color reference is assumed to be the general-purpose RGB color space. Accordingly, the lattice point data generation unit 16 generates the lattice point data of the general-purpose RGB color space.

The color conversion unit (second color conversion unit) 17 applies color conversion to the lattice point data using the profile. The color conversion unit 17 applies color conversion to the lattice point data generated by the lattice point data generation unit 16 using the input profile of the general-purpose RGB color space and the output profile of the reference device acquired by the input/output profile acquisition unit 15. Specifically, with respect to the lattice point data, the color conversion unit 17 converts the general-purpose RGB color space to the PCS corresponding to the device-independent color space (profile connection space) according to a correspondence relation defined in the input profile of the general-purpose RGB color space. In the input profile used in this case, each set of the general-purpose RGB values is defined to be associated with the PCS values corresponding to the device-independent color space. Accordingly, first, the color conversion unit 17 replaces the general-purpose RGB values of each piece of the lattice point data with the PCS values. In the present embodiment, a value of a CIE (Commission Internationale de l'Eclairage) Lab color space (L*a*b* color system) is assumed to be the PCS value. Next, the color conversion unit 17 converts the PCS to the color space of the reference device according to the correspondence relation defined in the output profile of the reference device. In the output profile used in this case, each set of the PCS values corresponding to the device-independent color space is defined to be associated with CMYK values corresponding to the color space of the reference device (device-dependent color space). Accordingly, the color conversion unit 17 replaces the PCS values of each piece of the lattice point data with the CMYK values corresponding to the reproduced color of the reference device. In the present embodiment, the color space of the reference device is assumed to be a CMYK color space. Next, the color conversion unit 17 converts the color space of the reference device to the PCS using the output profile that defines the PCS values with respect to the CMYK values of each piece of the lattice point data. Through such conversion processing, the color conversion unit 17 determines device-independent PCS data in a case where the general-purpose RGB data is printed by the reference device (determines the PCS values with which the general-purpose RGB values are replaced), and obtains converted lattice point data.

The color reference generation unit 18 generates color reference information that defines the color reference for reproducing the color characteristic of the reference device by the second output device. The color reference generation unit 18 uses the lattice point data (the PCS values of each lattice point) obtained by the color conversion unit 17 as the color reference (RGB color reference), and generates the color reference information according to a data format similar to that of the profile. The color reference generation unit 18 generates the color reference information of the RGB color space that defines the correspondence relation between the general-purpose RGB values and the PCS values in a case where the general-purpose RGB data is printed by the reference device, based on the lattice point data converted by the color conversion unit 17. In this way, the color reference generation unit 18 generates the color reference for reproducing the color characteristic of the reference device in the other output device 200. The generated color reference information is stored in the profile management server 100b as the input profile on the input side of the color reference. The generated color reference information may be embedded in the image data to be printed. A method for holding the generated color reference information may be any method as long as the information can be acquired (read) by the image processing server 100d described later.

Image Processing Function

As illustrated in FIG. 3(B), the image processing server 100d includes a communication unit 20, an input/output profile acquisition unit 21, a color reference acquisition unit 22, an image data acquisition unit 23, a color conversion unit (first color conversion unit) 24, an image data storage unit 91, and the like.

The communication unit 20 includes a receiving unit and a transmission unit, and performs data communication (transmission and reception of various pieces of information) between the image processing server 100d and the other server 100 as well as the output device 200. In this case, the other server 100 and the output device 200 includes the Web server 100a, the profile management server 100b, the color reference generation server 100c, various output devices 200, and the like. The communication unit 20 performs data communication by controlling the communication IF 104 included in the image processing server 100d.

The input/output profile acquisition unit 21 acquires an input/output profile from the profile management server 100b. The input/output profile acquisition unit 21 acquires the output profile of the print destination device used in color conversion from the profile management server 100b. The print destination device corresponds to the second output device (output device by which the color characteristic of the reference device is preferably reproduced) of which reproduced color should be matched with that of the reference device (first output device), among the output devices 200 of which reproduced colors should be close to each other in printing. The print destination device is designated by the user. Accordingly, the input/output profile acquisition unit 21 acquires the output profile (second output profile) of the designated print destination device from the profile management server 100b.

The color reference acquisition unit 22 acquires the color reference information. The color reference acquisition unit 22 acquires the color reference information held as the input profile from the profile management server 100b, for example. The color reference acquisition unit 22 may acquire embedded color reference information from the image data to be printed, for example.

The image data acquisition unit 23 acquires the image data to be printed. The image data to be printed is designated by the user via the UI function provided by the Web server 100a, for example. Accordingly, the image data acquisition unit 23 acquires the image data to be printed from the Web server 100a. When the Web server 100a transmits the image data to be printed received from the terminal 300 to the image processing server 100d to store the data in the image data storage unit 91, the image data acquisition unit 23 acquires the image data to be printed from the image data storage unit 91. The image data storage unit 91 corresponds to a predetermined storage region of the storage device included in the image processing server 100d.

The color conversion unit (first color conversion unit) 24 converts the color space on the input side (color space of the image data to be printed) to the color space on the output side (print destination) using the profile. The color conversion unit 24 converts the color space on the input side to the color space on the output side using the color reference information acquired by the color reference acquisition unit 22 and the output profile of the print destination device acquired by the input/output profile acquisition unit 21. Specifically, first, with respect to the image data to be printed (RGB data), the color conversion unit 24 converts the color space on the input side to the PCS corresponding to the device-independent color space according to the correspondence relation defined in the color reference information. In the color reference information used in this case, each set of the general-purpose RGB values is defined to be associated with the PCS values in a case where the general-purpose RGB data is printed by the reference device. Accordingly, the color conversion unit 24 replaces the RGB values corresponding to the input color of the image data to be printed with the PCS values in a case where the general-purpose RGB data is printed by the reference device. Next, the color conversion unit 24 converts the PCS to the color space on the output side according to the correspondence relation defined in the output profile of the print destination device. In the output profile used in this case, each set of the PCS values corresponding to the device-independent color space is defined to be associated with the CMYK values corresponding to the color space of the print destination device. Accordingly, the color conversion unit 24 replaces the PCS values with the CMYK values corresponding to the reproduced color of the print destination device. In this way, in the print control function according to the present embodiment, gamut mapping is not performed and the color space on the input side is converted to the color space on the output side (input RGB data is converted to CMYK data that can be output). The converted image data is then transmitted from the image processing server 100*d* to the print destination device designated by the user, and the converted image data is printed.

As described above, the print control function according to the present embodiment is implemented by software. Specifically, the print control function is implemented by executing a computer program (print control program) that implements the print control function in the server 100 and causing the functional parts to perform cooperative operation.

The program is stored and provided, as an installable or executable file, in the storage medium 108 that can be read by the server 100 (computer) serving as an execution environment. The program has a module configuration including each of the functional parts. The CPU 101 reads the program from the storage medium 108 and executes the program to generate each of the functional parts on a RAM of the main storage device 102. The method for providing the program is not limited thereto. For example, the program may be stored in a device connected to the Internet and the like, and downloaded via the network N through the communication IF 104. The program may be embedded and provided in a ROM of the main storage device 102, an HDD of the auxiliary storage device 103, and the like.

Described above is an example in which the print control function according to the present embodiment is implemented by executing the program (software). However, the embodiment is not limited thereto. For example, part or all of the functional parts may be implemented by hardware (a "dedicated circuit", a "dedicated processor", and the like).

The following describes processing in executing the program according to the present embodiment (cooperative operation of each of the functional parts) using a flowchart.

Processing of Print Control

Figure 4:
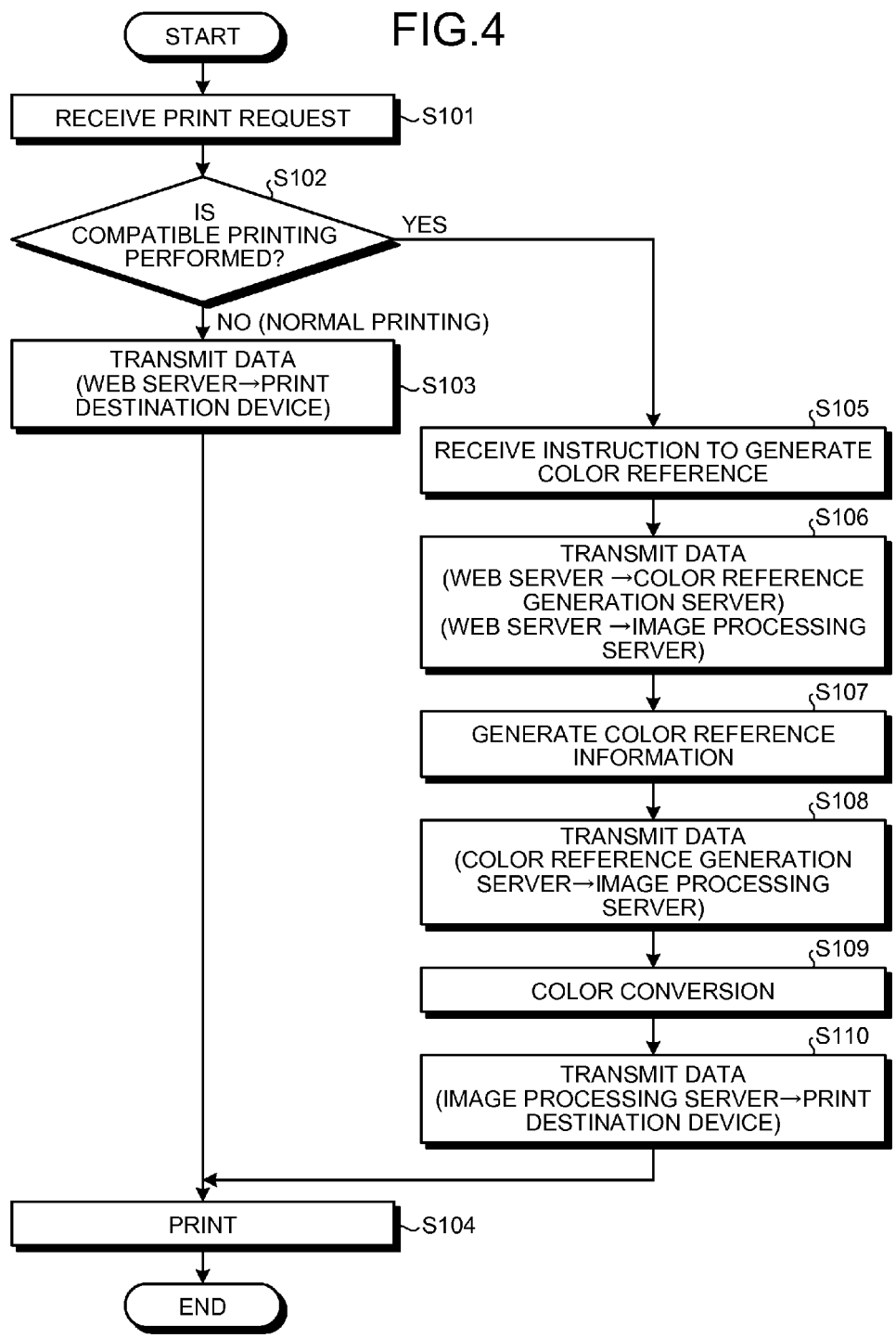
FIG. 4 is a flowchart illustrating an example of a processing procedure of print control according to the first embodiment.

FIG. 4 is a flowchart illustrating an example of a processing procedure of print control according to the present embodiment. FIG. 4 illustrates an example of processing of print control after receiving the print request from the user via the UI function provided by the Web server 100*a*.

The user designates, first, through the terminal 300, the image data to be printed (data desired to be printed) and the print destination device (second output device; the image forming apparatus by which the data should be printed). In this case, for example, the user utilizes a Web browser included in the terminal 300 to designate the image data to be printed and the print destination device for the Web server 100*a* via the network N. Following this, the Web server 100*a* provides a UI function that can set the print condition as illustrated for example in FIG. 5 to the terminal 300.

Figure 5:
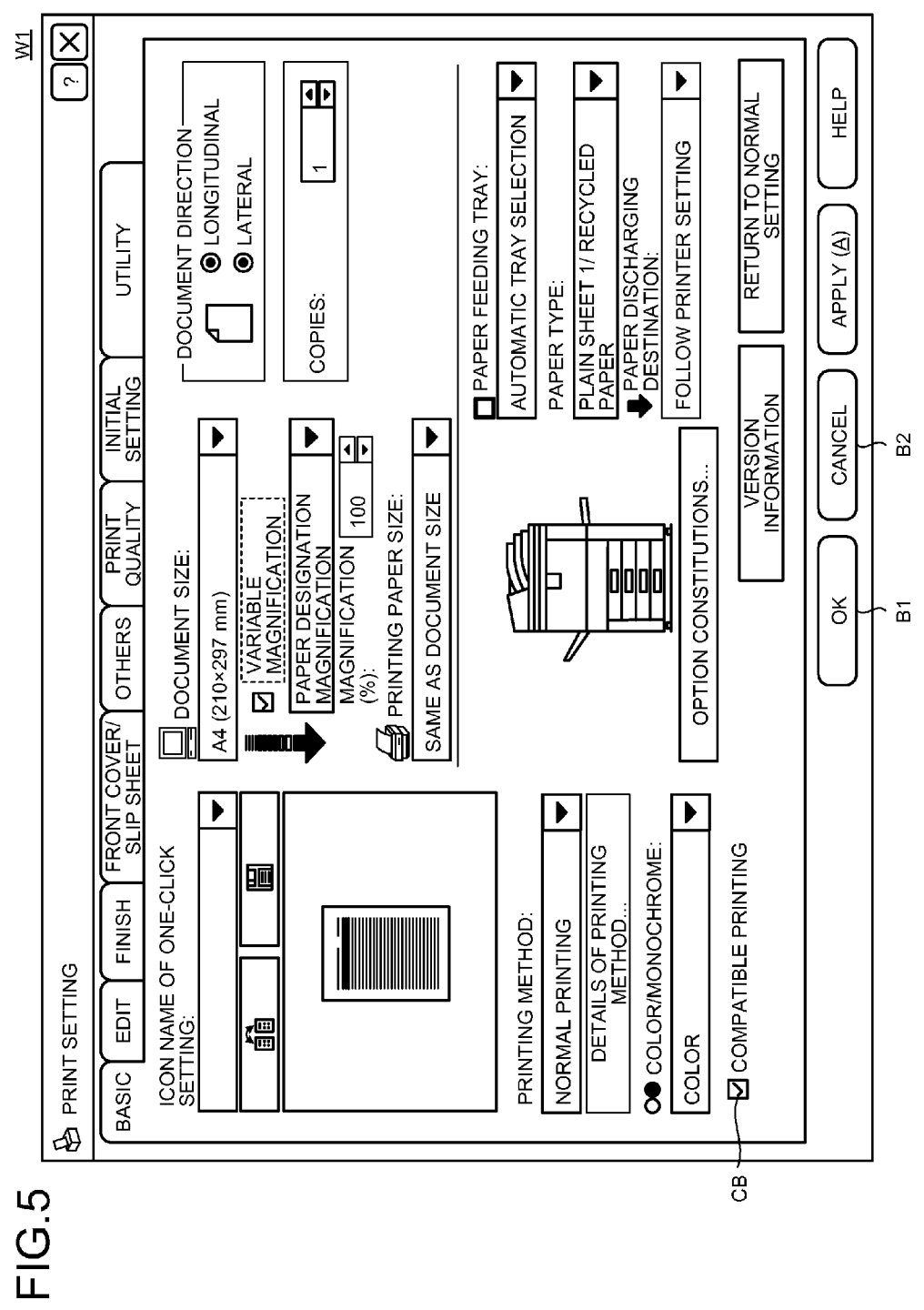

FIG. 5 is a diagram illustrating an example of a setting screen of the print condition according to the present embodiment. FIG. 5 illustrates an example of a screen when the terminal 300 displays the UI for setting the print condition to the print destination device designated as the print destination by the user. The user can set various print conditions in printing such as color/monochrome printing, the number of print copies, a sheet size, a sheet type (paper type), a paper feeding destination, and a paper discharging destination utilizing UI parts on a screen W1.

In this case, the user can designate an operation, whether or not to perform compatible printing with respect to the reference device of which reproduced color is desired to be matched in printing (whether or not to print the data in the same color as the reference device), by checking (turning ON/OFF) a checkbox CB on the screen W1. Specifically, to print the data in the same color as with the reference device, the checkbox CB for designating the operation of compatible printing is checked. In contrast, to print the data maximally utilizing the color gamut of the print destination device without adapting to the reference device, the checkbox CB for designating the operation of compatible printing is unchecked.

After finishing the various settings as described above, the user can request printing by pressing an [OK] button B1 on the screen W1. Accordingly, the Web server 100*a* receives the print request as well as the setting of the operation condition in printing from the terminal 300. To stop the printing, the user may press a [cancel] button B2 on the screen W1.

Returning back to the description of FIG. 4, if the Web server 100*a* receives the print request from the terminal 300 (Step S101), the Web server 100*a* determines whether or not to perform compatible printing based on a value representing the designated operation of compatible printing (ON/OFF of the checkbox CB) (Step S102).

As a result, if it is determined that the compatible printing is not performed (No at Step S102), the Web server 100*a* performs normal printing and transmits the image data to be printed to the print destination device (Step S103). That is, if it is determined that the compatible printing is not performed, the Web server 100*a* performs printing maximally utilizing the color gamut of the second output device. In this case, the Web server 100*a* acquires the image data to be printed designated by the user from the terminal 300, and transmits the acquired image data together with the received print setting data to the print destination device. The Web server 100*a* may acquire the image data to be printed designated by the user from the image data storage unit 91 via the image data acquisition unit 23 of the image processing server 100*d* to transmit the data to the print destination device.

The print destination device then prints the received image data according to the set print condition (Step S104).

Figure 6:
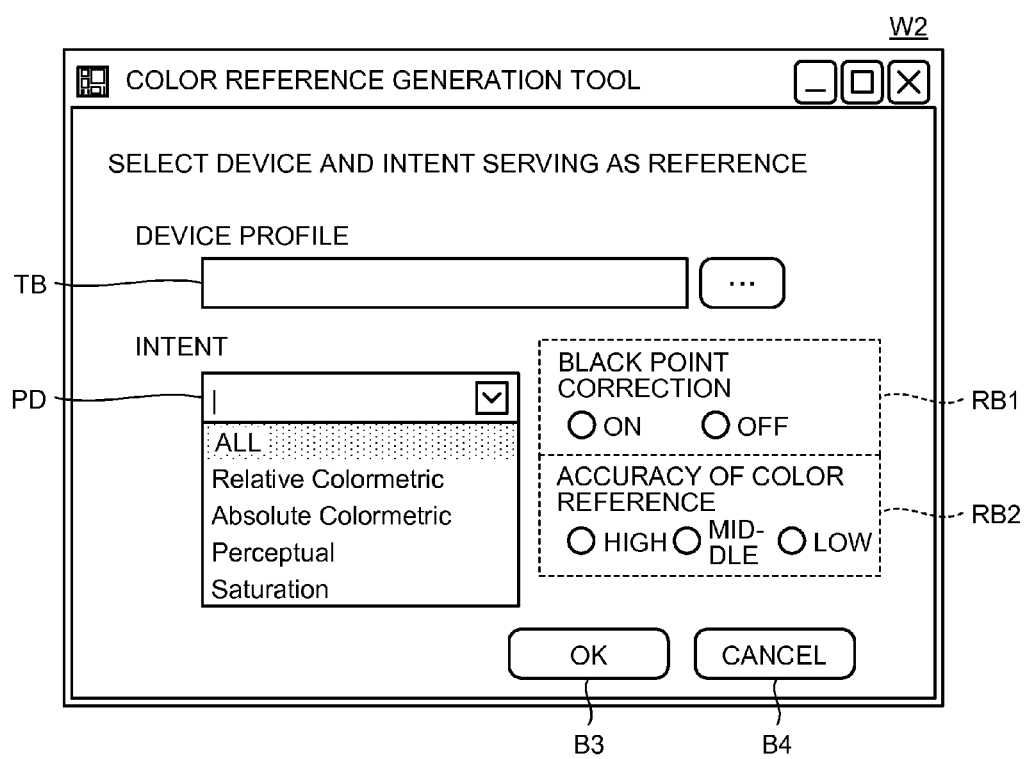
FIG. 6 is a diagram illustrating an example of a setting screen of a color reference generation condition according to the first embodiment.

If it is determined that the compatible printing is performed (Yes at Step S102), the Web server 100*a* provides a UI function that can set the color reference generation condition at the time of compatible printing as illustrated in FIG. 6, for example, to the terminal 300.

FIG. 6 is a diagram illustrating an example of a setting screen of the color reference generation condition according to the present embodiment. FIG. 6 illustrates an example of the screen when the terminal 300 displays the UI for setting the color reference generation condition in compatible printing designated by the user. The user can set various generation conditions in generating the color reference as follows utilizing UI parts on a screen W2. Examples of the generation condition that can be set include the reference device, a rendering intent of the reference device (a color conversion system of the first output device), the black point correction in color conversion, and accuracy of the generated color reference (size of the interval width between the lattice points).

In this case, the user can designate the reference device serving as the reference of color matching in generating the color reference by inputting an output profile name (profile identification information) of the reference device in a text box TB on the screen W2. The setting method may be as follows, in addition to the input of the output profile name. In the setting method, for example, the Web server 100*a* may access the profile management server 100*b*, list managed profiles, and select the corresponding profile from the displayed list.

The user can designate the rendering intent of the reference device by selecting a list item of a pull-down menu PD on the screen W2.

Generally, in the ICC profile used for color conversion of an image, tags (identification information for identifying each color conversion system) are defined corresponding to a plurality of rendering intents (color conversion systems) so that appropriate color conversion can be performed corresponding to an image characteristic. For example, for a natural image such as a photograph, defined is a tag of the rendering intent "Perceptual" that places importance on perception (gradation property). For an image that requires vividness such as a graphic image, for example, defined is a tag of the rendering intent "Saturation" that places importance on chroma.

Accordingly, the user determines, from the feature of the image to be printed, which of the rendering intents of the reference device becomes a basis for generating the color reference information. According to the result thereof, the user selects the rendering intent from the list items of the pull-down menu PD on the screen W2. For example, in a case of embedding the tags of all of the rendering intents of the reference device as tags for the color reference information (in a case of generating the color reference information including all of the tags), the user selects a list item "ALL" of the pull-down menu PD on the screen W2. In a case of embedding a tag of a predetermined rendering intent among the rendering intents of the reference device as each tag of the color reference information (in a case of generating the color reference information including part of the tags), the user selects any one of "Perceptual", "Saturation", "Relative Colorimetric", and "Absolute Colorimetric" corresponding to the tag to be embedded from the list items of the pull-down menu PD on the screen W2. The reason why the part of the rendering intents of the reference device is embedded as the tag of the color reference information is to prevent color conversion from being performed with the rendering intent unsuitable for the feature of the image to be printed when color conversion based on the ICC profile is performed. Accordingly, the user can generate the color reference information for forcibly performing the intended color conversion.

The user can designate an operation, whether or not to perform black point correction in color conversion when the color reference is generated, by selecting a radio button RB1 on the screen W2. Specifically, when the user wants to perform black point correction, the user selects an [ON] item of the radio button RB1 that sets the designation of performing black point correction. When the user does not perform black point correction, the user selects an [OFF] item of the radio button RB1 that sets the designation of not performing black point correction.

The user can also set the designation of the accuracy of the color reference to be generated (a size of the interval width between the lattice points) in a stepwise manner by selecting the radio button RB2 on the screen W2. Specifically, when the user wants to reduce (narrow) the interval width between the lattice points and increase the accuracy of the color reference to be generated (give higher priority to the accuracy than to a processing speed), the user selects a [high] item of the radio button RB2 that sets the designation of the accuracy of the color reference. When the user wants to increase (widen) the interval width between the lattice points and reduce the accuracy of the color reference to be generated (give higher priority to the processing speed than to the accuracy), the user selects a [low] item of the radio button RB2 that sets the designation of the accuracy of the color reference.

After finishing such various settings, the user can instruct to generate the color reference by pressing an [OK] button B3 on the screen W2. Accordingly, the Web server 100*a* receives, from the terminal 300, the instruction to generate the color reference as well as the setting of operation condition in generating the color reference. To stop the compatible printing, the user may press a [cancel] button B4 on the screen W2. As a result, the previous screen W1 is displayed by the terminal 300, and the user can restart from the setting of the print condition.

Returning back to the description of FIG. 4, if the Web server 100*a* receives the instruction to generate the color reference from the terminal 300 (Step S105), the Web server 100*a* transmits the received data of the setting of the color reference generation condition (setting information of the operation condition in generating the color reference) to the color reference generation server 100*c*. The Web server 100*a* also transmits, to the color reference generation server 100*c*, the output profile name (profile identification information) of the reference device (first output device) received as a condition setting in generating the color reference, and the identification information of the image data to be printed designated by the user. The Web server 100*a* also transmits, to the image processing server 100*d*, the identification information of the output profile of the print destination device designated by the user and the received data of print setting (Step S106). When acquiring the image data to be printed designated by the user from the terminal 300, the Web server 100*a* transmits the acquired image data to the image processing server 100*d*.

In the color reference generation server 100*c*, when the communication unit 10 receives the data, the color reference generation unit 18 generates the color reference information according to the setting of the color reference generation condition (Step S107). Details of processing for generating the color reference information in this case will be described later with reference to FIG. 7. As a result, the color reference generation server 100*c* transmits data notifying that the color reference information is generated to the image processing server 100*d* through the communication unit 10 (Step S108).

If the image processing server 100*d* receives the data through the communication unit 20, the color conversion unit 24 applies color conversion to the image data to be printed using the color reference information and the output profile of the print destination device (Step S109). In this case, in the image processing server 100*d*, the color reference acquisition unit 22 acquires the color reference information managed as the input profile from the profile management server 100*b*. In the image processing server 100*d*, the input/output profile acquisition unit 21 acquires, from the profile management server 100b, the profile that is specified based on the identification information of the profile, as the output profile of the print destination device. In the image processing server 100d, the image data acquisition unit 23 acquires, from the image data storage unit 91, the image data that is specified based on the identification information of the image data, as the image data to be printed. Thereafter, the color conversion unit 24 converts the RGB color space (color space on the input side) of the image data to be printed (RGB data) to the PCS (replaces the RGB values with the PCS value) using the acquired color reference information. Subsequently, the color conversion unit 24 converts the PCS to the CMYK color space (color space on the output side) (replaces the PCS values with the CMYK value) using the output profile of the print destination device.

The image processing server 100d transmits, to the print destination device, the thus converted image data (CMYK data) together with the received data of print setting (Step S110).

The print destination device then prints the received image data according to the set print condition (Step S104).

Processing in Generating Color Reference

Figure 7:
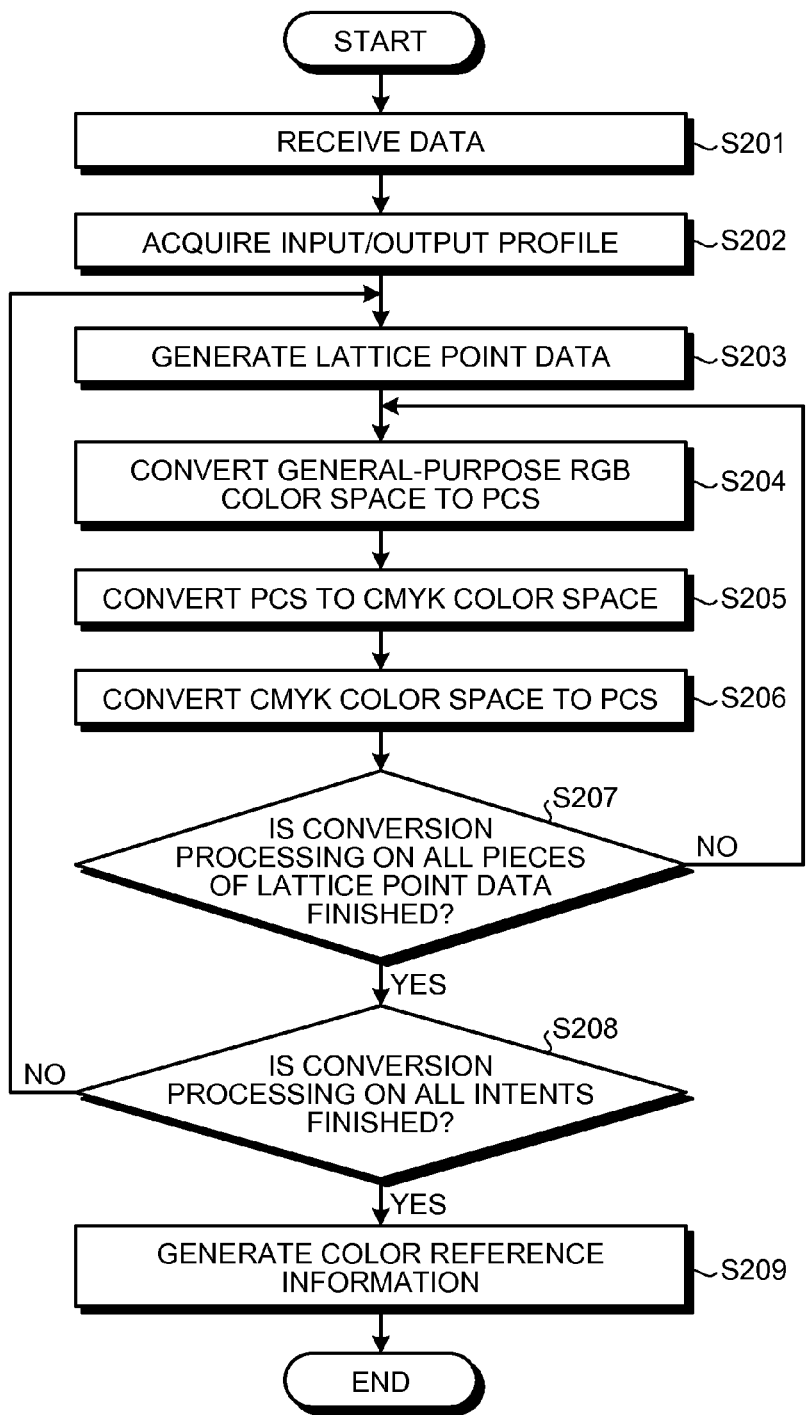
FIG. 7 is a flowchart illustrating an example of a processing procedure when the color reference is generated according to the first embodiment.

FIG. 7 is a flowchart illustrating an example of a processing procedure when the color reference is generated according to the present embodiment. FIG. 7 illustrates a detailed example of processing in generating the color reference performed by the color reference generation server 100c.

As illustrated in FIG. 7, the color reference generation server 100c receives the data of setting of the color reference generation condition through the communication unit 10 (Step S201).

Next, the color reference generation server 100c acquires the input/output profile from the profile management server 100b through the input/output profile acquisition unit 15 (Step S202). In this case, the input/output profile acquisition unit 15 acquires the output profile of the reference device from among the input/output profiles managed by the profile management server 100b based on the identification information of the profiles included in the setting of the color reference generation condition. The input/output profile acquisition unit 15 acquires the output profile that defines the PCS values with respect to the CMYK values corresponding to the reproduced color of the reference device based on the device information acquired by the reference device information acquisition unit 11. The input/output profile acquisition unit 15 also acquires the input profile of the general-purpose RGB color space corresponding to the image data based on the image data to be printed designated by the user. The method for acquiring the input profile may be a method for acquiring the input profile embedded in the image data to be printed.

Next, the color reference generation server 100c determines the interval width between the lattice points by the lattice point data generation unit 16 based on the accuracy information acquired by the accuracy information acquisition unit 14, and generates the lattice point data of the general-purpose RGB color space (Step S203). The accuracy information acquisition unit 14 acquires, as the accuracy information, the set value of the accuracy of the color reference (a stage value such as "high", "middle", and "low") included in the setting of the color reference generation condition.

When "high" is designated as the accuracy of the color reference, for example, the lattice point data generation unit 16 generates RGB values dividing the RGB space into 32 sections, each of which channel takes values from 0 to 100. Specifically, the lattice point data generation unit 16 generates the RGB values as follows: (R, G, B)=(0, 0, 0), (0, 0, 3.226), (0, 0, 6.452), . . . , (0, 0, 100), (0.3226, 0), (0, 3.226, 3.226), . . . , (0, 3.226, 6.452), . . . , (0, 100, 100), . . . , (100, 100, 100). When "middle" is designated as the accuracy of the color reference, the lattice point data generation unit 16 generates the RGB values dividing the RGB space into 16 sections. When "low" is designated as the accuracy of the color reference, the lattice point data generation unit 16 generates the RGB values dividing the RGB space into 8 sections. In this way, as the accuracy of the color reference decreases, the interval width between the lattice points increases (widens) and the number of the lattice points decreases (the number of division decreases).

Next, the color reference generation server 100c performs, through the color conversion unit 17, conversion processing as follows on each piece of the lattice point data generated by the lattice point data generation unit 16.

Regarding each piece of the lattice point data, the color conversion unit 17 converts the general-purpose RGB color space to the PCS according to the correspondence relation defined in the input profile of the general-purpose RGB color space (Step S204). Specifically, the color conversion unit 17 replaces the general-purpose RGB values (R, G, B) of each lattice point with the PCS values (L, a, b). The input profile corresponds to a look up table (LUT) that defines the PCS values corresponding to each lattice point of the general-purpose RGB color space, or a matrix for converting the general-purpose RGB color space to the PCS. In this case, the color conversion unit 17 determines whether or not to perform black point correction based on the black point correction information acquired by the black point correction information acquisition unit 13, and performs black point correction based on the determination result. The black point correction information acquisition unit 13 acquires, as the black point correction information, a set value that designates whether or not to perform black point correction (set value for execution designation/non-execution designation) included in the setting of the color reference generation condition. As a result, if it is determined that black point correction is performed, the color conversion unit 17 performs correction by replacing the general-purpose RGB values (0, 0, 0) of a lattice point determined to be a black point (a region determined to be a black point) with the PCS values corresponding to the black point of the input profile. Accordingly, when the input profile is LUT, the color conversion unit 17 replaces the general-purpose RGB values of each lattice point with the PCS values by interpolation operation. When the LUT is prepared for each type of the rendering intent, the color conversion unit 17 uses the LUT corresponding to the rendering intent "Relative Colorimetric".

Next, the color conversion unit 17 converts the PCS to the CMYK color space of the reference device according to the correspondence relation defined in the output profile of the reference device (Step S205). Specifically, the color conversion unit 17 replaces each set of the PCS values (L, a, b) with CMYK values (C, M, Y, K). The output profile used in this case is the color conversion information as illustrated in FIG. 8, for example.

FIG. 8 is a diagram illustrating an example of data of color conversion information D1 (Part 1) according to the present embodiment. FIG. 8 illustrates an LUT that defines the CMYK values (C, M, Y, K) of the CMYK color space of the reference device with respect to each set of the PCS values (L, a, b), as an example of the color conversion information D1.

Returning back to the description of FIG. 7, when the color conversion information D1 is prepared for each type of the rendering intent, the color conversion unit 17 uses the color conversion information D1 corresponding to the rendering intent designated (selected) by the user as the setting of the color reference generation condition. When the rendering intent "ALL" is designated by the user as the setting of the color reference generation condition, the color conversion unit 17 uses the color conversion information D1 identified by each tag of the rendering intents "Perceptual", "Saturation", "Relative Colorimetric", and "Absolute Colorimetric". Accordingly, the color conversion unit 17 determines CMYK data in a case where the input image data (general-purpose RGB data) is printed in the color space of the reference device.

Next, the color conversion unit 17 converts the CMYK color space of the reference device to the PCS using the output profile that defines the PCS values with respect to the CMYK values of each lattice point (Step S206). Specifically, the color conversion unit 17 replaces, with the PCS values (L, a, b), each set of the CMYK values (C, M, Y, K) in a case where the input image data (general-purpose RGB data) is printed in the color space of the reference device. The output profile used in this case is the color conversion information as illustrated in FIG. 9, for example.

FIG. 9 is a diagram illustrating an example of data of color conversion information D2 (Part 2) according to the present embodiment. FIG. 9 illustrates an LUT that defines the PCS values (L, a, b) with respect to the CMYK values (C, M, Y, K) of the CMYK color space of the reference device, as an example of the color conversion information D2.

Returning back to the description of FIG. 7, with such conversion processing, the color conversion unit 17 determines the PCS data in a case where the input image data (general-purpose RGB data) is printed by the reference device, and obtains the converted lattice point data.

Next, the color reference generation server 100c determines whether or not conversion processing on all pieces of the lattice point data generated by the lattice point data generation unit 16 is finished (Step S207).

The color reference generation server 100c then repeats the processing from Step S204 to S206 performed by the color conversion unit 17 until the conversion processing on all pieces of the lattice point data is finished (No at Step S207).

If the conversion processing on all pieces of the lattice point data is finished (Yes at Step S207), the color reference generation server 100c determines whether or not the conversion processing is finished on all of the rendering intents designated by the user as the setting of the color reference generation condition (Step S208).

The color reference generation server 100c then repeats the processing from Step S203 to S207 until the conversion processing on all of the rendering intents is finished (No at Step S208). Accordingly, for example, when the user designates one rendering intent as the setting of the color reference generation condition, the color reference generation server 100c performs processing from Step S203 to S207 once on the designated rendering intent. When the user designates the rendering intent "ALL" as the setting of the color reference generation condition, the color reference generation server 100c performs processing from Step S203 to S207 on each of the rendering intents "Perceptual", "Saturation", "Relative Colorimetric", and "Absolute Colorimetric". That is, the processing from Step S203 to S207 is repeated corresponding to the number of designation of the rendering intents.

If the conversion processing on all of the rendering intents is finished (Yes at Step S208), the color reference generation server 100c generates, by the color reference generation unit 18, the color reference information based on the lattice point data obtained by the color conversion unit 17 (Step S209). In this case, the color reference generation unit 18 uses, as the color reference (RGB color reference), the lattice point data in a case where the input image data (general-purpose RGB data) is printed by the reference device, and generates the color reference information according to the data format similar to that of the profile. The color reference generation unit 18 generates the color reference information as illustrated in FIG. 10, for example.

FIG. 10 is a diagram illustrating an example of data of color reference information D3 according to the present embodiment. FIG. 10 illustrates an LUT that defines the correspondence relation between the general-purpose RGB values (R, G, B) and the PCS values (L, a, b) of each lattice point, as an example of the color reference information D3 of the RGB color space.

Returning to FIG. 7, when the user designates the rendering intent "ALL" as the setting of the color reference generation condition, for example, the color reference generation unit 18 generates the color reference information D3 for each of the rendering intents. When the user designates a predetermined rendering intent as the setting of the color reference generation condition, the color reference information D3 generated corresponding to the designated rendering intent is used as the color reference information D3 with respect to the rendering intents other than the designated rendering intent.

In this way, the print control system 1000 according to the present embodiment generates the color reference for converting, to the PCS data, the general-purpose RGB data in a case where the image data to be printed is printed by the reference device. The print control system 1000 according to the present embodiment performs color conversion on the image data to be printed based on the generated color reference and the color reproduction characteristic of the print destination device. As a result, the print control system 1000 according to the present embodiment can perform compatible printing that can reproduce the color characteristic of the reference device by the print destination device without gamut mapping depending on the output device 200.

Conclusion

As described above, in the print control system 1000 according to the present embodiment, the color reference generation server 100c determines the device-independent PCS data in a case where the general-purpose RGB data is printed by the first output device using the input profile of the general-purpose RGB data and the output profile of the first output device serving as the reference of color matching. Next, in the print control system 1000 according to the present embodiment, the color reference generation server 100c sets the correspondence relation between the general-purpose RGB values and the PCS values as the color reference information D3 of the RGB color space. Subsequently, in the print control system 1000 according to the present embodiment, the image processing server 100d converts the RGB color space of the image data to be printed on the input side to the CMYK color space on the output side using the color reference information D3 and the output profile of the second output device of which reproduced color should be matched with that of the first output device. As a result, in the print control system 1000 according to the present embodiment, the image processing server 100d transmits the converted image data (CMYK data) and the second output device performs printing.

Accordingly, the print control system 1000 according to the present embodiment provides an environment for performing color conversion on the image data to be printed based on the color reference obtained from the color reproduction characteristic of the first output device serving as a compatible destination and the color reproduction characteristic of the second output device serving as a print destination. As a result, the print control system 1000 according to the present embodiment can match the reproduced colors for each output device 200 without gamut mapping depending on the output device 200, and can provide high-quality print service.

In the above embodiment, description has been made using the CIELab color space as the PCS. However, it is not limited thereto. For example, the PCS may be a CIEXYZ color space (XYZ color system) or a CIELuv color space (L*u*v* color system). In the above embodiment, description has been made using the CMYK color space as the color space of the output device 200. However, it is not limited thereto. The color space of the output device 200, for example, may be a CMY space or an RGB space depending on the output device.

According to the present invention, the reproduced colors for each output device can be matched.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print control system comprising:
a color reference generation unit configured to generate color reference information defining a color reference for reproducing a color characteristic of a first output device by a second output device designated as a print destination using a first output profile representing a color reproduction characteristic of the first output device serving as a reference of color matching, wherein the color reference generation unit generates the color reference information based on PCS data of a profile connection space (PCS) corresponding to a device-independent color space in a case of outputting general-purpose RGB data of a general-purpose RGB color space corresponding to a color space on an input side of the color reference by the first output device;
a first color conversion unit configured to apply color conversion to image data designated as a print target using the color reference information and a second output profile representing a color reproduction characteristic of the second output device;
a transmission unit configured to transmit the converted image data to the second output device, and to request printing;
a lattice point data generation unit configured to generate lattice point data of a color space; and
a second color conversion unit configured to perform color conversion on the generated lattice point data using a profile representing a color reproduction characteristic of the color space;
wherein the lattice point data generation unit generates the lattice point data of the general-purpose RGB color space;
wherein the second color conversion unit determines the PCS data in a case of outputting the general-purpose RGB data with respect to the lattice point data by the first output device using an input profile representing a color reproduction characteristic of the general-purpose RGB color space and the first output profile of the first output device;
wherein the color reference generation unit generates the color reference information based on the determined PCS data; and wherein the second color conversion unit replaces the general-purpose RGB values of a lattice point determined to be a black point among the lattice point data with the PCS values corresponding to the black point of the input profile, and performs black point correction.

2. The print control system according to claim 1, wherein the second color conversion unit replaces general-purpose RGB values of the lattice point data with PCS values using the input profile that defines the PCS values of a device-independent color space corresponding to the general-purpose RGB values to convert the general-purpose RGB color space to the PCS, replaces the PCS values of the lattice point data with CMYK values using the first output profile that defines the CMYK values corresponding to the color space of the first output device with respect to the PCS values to convert the PCS to the color space of the first output device, replaces the CMYK values of the lattice point data with the PCS values using a profile that defines the PCS values with respect to the CMYK values to convert the color space of the first output device to the PCS, and determines the PCS data in a case of outputting the general-purpose RGB data by the first output device, and
the color reference generation unit generates the color reference information that defines a correspondence relation between the general-purpose RGB values and the determined PCS values based on the lattice point data in which the determined PCS values correspond to values of each lattice point.

3. The print control system according to claim 2, wherein when a predetermined color conversion system of the first output device is designated, the second color conversion unit replaces, with the CMYK values, the PCS values with which the general-purpose RGB values of the lattice point data are replaced using the color conversion information corresponding to the designated color conversion system among the color conversion information defined in the first output profile, replaces the CMYK values of the lattice point data with the PCS values using a profile that defines the PCS values with respect to the CMYK values, and determines the PCS data in a case of outputting the general-purpose RGB data by the first output device, and
the color reference generation unit generates the color reference information corresponding to the designated color conversion system based on the determined PCS data.

4. The print control system according to claim 2, wherein when a predetermined color conversion system of the first output device is not designated, the second color conversion unit replaces, with the CMYK values, the PCS values with which the general-purpose RGB values of the lattice point data are replaced using the color conversion information corresponding to each piece of color conversion information defined in the first output profile, replaces the CMYK values of the lattice point data with the PCS values using a profile that defines the PCS values with respect to the CMYK values, and determines a plurality of pieces of PCS data in a case of outputting the general-purpose RGB data by the first output device, and
the color reference generation unit generates the color reference information for each color conversion system based on the determined pieces of PCS data.

5. The print control system according to claim 1, wherein the lattice point data generation unit determines an interval width between the lattice points based on accuracy information representing accuracy of the color reference and generates the lattice point data of the general-purpose RGB color space.

6. A print control method comprising:
generating color reference information defining a color reference for reproducing a color characteristic of a first output device by a second output device designated as a print destination using a first output profile representing a color reproduction characteristic of the first output device serving as a reference of color matching, wherein the color reference information is based on PCS data of a profile connection space (PCS) corresponding to a device-independent color space in a case of outputting general-purpose RGB data of a general-purpose RGB color space corresponding to a color space on an input side of the color reference by the first output device;
applying color conversion to image data designated as a print target using the color reference information and a second output profile representing a color reproduction characteristic of the second output device;
generating lattice point data of the general-purpose RGB color space; and
performing color conversion on the generated lattice point data using a profile representing a color reproduction characteristic of the color space;
determining the PCS data in a case of outputting the general-purpose RGB data with respect to the lattice point data by the first output device using an input profile representing a color reproduction characteristic of the general-purpose RGB color space and the first output profile of the first output device;
generating the color reference information based on the determined PCS data and replacing the general-purpose RGB values of a lattice point determined to be a black point among the lattice point data with the PCS values corresponding to the black point of the input profile;
performing black point correction;
transmitting the converted image data to the second output device; and
requesting printing.

7. A computer program product comprising a non-transitory computer-readable recording medium having a print control program that causes a computer to execute:
generating color reference information defining a color reference for reproducing a color characteristic of a first output device by a second output device designated as a print destination using a first output profile representing a color reproduction characteristic of the first output device serving as a reference of color matching, wherein the color reference information is based on PCS data of a profile connection space (PCS) corresponding to a device-independent color space in a case of outputting general-purpose RGB data of a general-purpose RGB color space corresponding to a color space on an input side of the color reference by the first output device;
applying color conversion to image data designated as a print target using the color reference information and a second output profile representing a color reproduction characteristic of the second output device;
generating lattice point data of the general-purpose RGB color space;
performing color conversion on the generated lattice point data using a profile representing a color reproduction characteristic of the color space;
determining the PCS data in a case of outputting the general-purpose RGB data with respect to the lattice point data by the first output device using an input profile representing a color reproduction characteristic of the general-purpose RGB color space and the first output profile of the first output device;
generating the color reference information based on the determined PCS data and replacing the general-purpose RGB values of a lattice point determined to be a black point among the lattice point data with the PCS values corresponding to the black point of the input profile;
performing black point correction;
transmitting the converted image data to the second output device; and
requesting printing.

8. A print control system comprising:
a color reference generation unit configured to generate color reference information defining a color reference for reproducing a color characteristic of a first output device by a second output device designated as a print destination using a first output profile representing a color reproduction characteristic of the first output device serving as a reference of color matching, wherein the color reference generation unit generates the color reference information based on PCS data of a profile connection space (PCS) corresponding to a device-independent color space in a case of outputting general-purpose RGB data of a general-purpose RGB color space corresponding to a color space on an input side of the color reference by the first output device;
a first color conversion unit configured to apply color conversion to image data designated as a print target using the color reference information and a second output profile representing a color reproduction characteristic of the second output device;
a transmission unit configured to transmit the converted image data to the second output device, and to request printing;
a lattice point data generation unit configured to generate lattice point data of a color space; and
a second color conversion unit configured to perform color conversion on the generated lattice point data using a profile representing a color reproduction characteristic of the color space;
wherein the lattice point data generation unit generates the lattice point data of the general-purpose RGB color space;
wherein the second color conversion unit determines the PCS data in a case of outputting the general-purpose RGB data with respect to the lattice point data by the first output device using an input profile representing a color reproduction characteristic of the general-purpose RGB color space and the first output profile of the first output device;
wherein the color reference generation unit generates the color reference information based on the determined PCS data;
wherein the second color conversion unit replaces general-purpose RGB values of the lattice point data with PCS values using the input profile that defines the PCS values of a device-independent color space corresponding to the general-purpose RGB values to convert the general-purpose RGB color space to the PCS, replaces the PCS values of the lattice point data with CMYK values using the first output profile that defines the CMYK values corresponding to the color space of the first output device with respect to the PCS values to convert the PCS to the color space of the first output device, replaces the CMYK values of the lattice point data with the PCS values using a profile that defines the PCS values with respect to the CMYK values to convert the color space of the first output device to the PCS, and determines the PCS data in a case of outputting the general-purpose RGB data by the first output device;

wherein the color reference generation unit generates the color reference information that defines a correspondence relation between the general-purpose RGB values and the determined PCS values based on the lattice point data in which the determined PCS values correspond to values of each lattice point;

wherein when a predetermined color conversion system of the first output device is not designated, the second color conversion unit replaces, with the CMYK values, the PCS values with which the general-purpose RGB values of the lattice point data are replaced using the color conversion information corresponding to each piece of color conversion information defined in the first output profile, replaces the CMYK values of the lattice point data with the PCS values using a profile that defines the PCS values with respect to the CMYK values, and determines a plurality of pieces of PCS data in a case of outputting the general-purpose RGB data by the first output device; and wherein the color reference generation unit generates the color reference information for each color conversion system based on the determined pieces of PCS data.

9. The print control system according to claim 8, wherein when a predetermined color conversion system of the first output device is designated, the second color conversion unit replaces, with the CMYK values, the PCS values with which the general-purpose RGB values of the lattice point data are replaced using the color conversion information corresponding to the designated color conversion system among the color conversion information defined in the first output profile, replaces the CMYK values of the lattice point data with the PCS values using a profile that defines the PCS values with respect to the CMYK values, and determines the PCS data in a case of outputting the general-purpose RGB data by the first output device, and the color reference generation unit generates the color reference information corresponding to the designated color conversion system based on the determined PCS data.

* * * * *